UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

MAGNESIUM SALT OF DIBROMBEHENIC ACID.

No. 919,335.  Specification of Letters Patent.  Patented April 27, 1909.

Application filed August 12, 1908. Serial No. 448,240. (Specimens.)

*To all whom it may concern:*

Be it known that I, EMIL FISCHER, professor of chemistry, citizen of the German Empire, residing at Berlin, Kingdom of Prussia, Germany, have invented new and useful Improvements in Magnesium Salts of Dibrombehenic Acid, of which the following is a specification.

I have found that the dibromobehenic acid gives a solid stable, tasteless and odorless magnesium salt, which is a valuable substitute for potassium bromid, an average dose being from 1 to 2 grams.

My new preparation is obtained by converting the free dibromobehenic acid or its alkaline salts into the magnesium salt. The dibromobehenic acid is prepared by treating erucic acid with bromin.

The preparation of the magnesium salt of dibromobehenic acid is carried out as follows:

49.8 parts of dibrombehenic acid are dissolved by shaking at ordinary temperature with so much of a diluted caustic potash solution of about 1/40 normal strength as corresponds to 5.6 parts of KOH. The calculated quantity of a dilute aqueous solution of chlorid of magnesium, namely 10.2 parts, (crystals + 6 aq.), is added to the solution, and it is stirred until the colorless flocculent precipitate has settled. It is filtered off with suction, pressed, washed with alcohol, mixed up by stirring with cold water, filtered off with suction and subsequently washed with water until the wash-water is free from chlorin. It is then washed with alcohol and dried *in vacuo*. The magnesium salt thus obtained is a white, tasteless and odorless powder almost insoluble in water and alcohol. It has the formula: $(C_{22}H_{41}Br_2O_2)_2Mg$.

The yield of the above process is a good one.

Having now described my invention and in what manner the same is to be performed, what I claim as new and desire to secure by Letters Patent is:—

The herein-described magnesium salt of dibromobehenic acid of the following formula $(C_{22}H_{41}O_2Br_2)_2Mg$ obtainable by treating an alkaline solution of dibromobehenic acid with chlorid of magnesium, which magnesium salt is a white solid body, tasteless, odorless and almost insoluble in water, insoluble in alcohol, soluble in ether and chloroform and which is a valuable substitute for potassium bromid, substantially as hereinbefore described.

In testimony whereof I have hereunto set my hand in the presence of two subscribing witnesses.

EMIL FISCHER.

Witnesses:
  HENRY HASPER,
  ARTHUR SCHROEDER.